United States Patent
Study et al.

(10) Patent No.: US 7,248,174 B2
(45) Date of Patent: *Jul. 24, 2007

(54) AUTOMATIC SENSING OF SAFE-OPERATION SENSOR APPARATUS AND METHOD

(75) Inventors: Robert Study, Arlington Heights, IL (US); Eric Robb, Carol Stream, IL (US); William Gioia, Winfield, IL (US); David Stafford, Bellaire, TX (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/261,885

(22) Filed: Oct. 28, 2005

(65) Prior Publication Data

US 2006/0181234 A1    Aug. 17, 2006

Related U.S. Application Data

(63) Continuation of application No. 10/135,889, filed on Apr. 30, 2002, now Pat. No. 7,057,519.

(51) Int. Cl.
*G08B 21/00* (2006.01)

(52) U.S. Cl. .................. 340/686.6; 340/686.1; 340/545.1; 340/540; 340/541; 318/280; 318/484; 318/468; 318/626

(58) Field of Classification Search ........... 340/686.6, 340/686.1, 545.1, 540, 541; 318/280, 484, 318/468, 626

See application file for complete search history.

(56) References Cited

U.S. PATENT DOCUMENTS

| | | | |
|---|---|---|---|
| 4,808,995 A | 2/1989 | Clark et al. | |
| 5,233,185 A | 8/1993 | Whitaker | |
| 5,428,923 A | 7/1995 | Waggamon | |
| 5,508,511 A | 4/1996 | Zur et al. | |
| 6,046,562 A | 4/2000 | Emil | |
| 6,346,889 B1 | 2/2002 | Moss | |
| 6,581,332 B1 | 6/2003 | Kim | |
| 6,737,968 B1 | 5/2004 | Ergun et al. | |
| 6,989,767 B2 * | 1/2006 | Fitzgibbon et al. | ...... 340/908.1 |

FOREIGN PATENT DOCUMENTS

EP      1 304 442 A2    4/2003

OTHER PUBLICATIONS

International Search Report for PCT/US03/13664 mailed Feb. 19, 2004.

\* cited by examiner

*Primary Examiner*—Tai Nguyen
(74) *Attorney, Agent, or Firm*—Fitch, Even, Tabin & Flannery

(57) ABSTRACT

A movable barrier operator having a microprocessor (10) or other programmable platform will automatically work in a safe and appropriate manner both with and without safe-operation sensors (13). Once a safe-operation sensor is detected, the operator will thereafter function in a fashion that requires the continued presence of such sensor. In one embodiment, the operator state can be purposely reset to the initial operating state.

8 Claims, 3 Drawing Sheets

AUTOMATIC SENSING OF SAFE-OPERATION SENSOR APPARATUS AND METHOD

CROSS-REFERENCES TO RELATED APPLICATIONS

This is a continuation of prior application Ser. No. 10/135,889 filed Apr. 30, 2002, now U.S. Pat. No. 7,057,519, which is hereby incorporated herein by reference in its entirety.

FIELD OF THE INVENTION

This invention relates generally to safe-operation sensing and more particularly to movable barrier operators.

BACKGROUND

Movable barrier operators are well known in the art. Such operators generally serve to selectively move a movable barrier (such as a segmented or one-piece garage door, swinging gate, sliding gate, rolling shutter, and so forth) between an opened and a closed position using one or more motors. It is also known to use safe-operation sensors with such operators to aid in ensuring that the movable barrier can be so moved without undue risk to persons or property in the immediate vicinity. Typically, such sensors are designed to detect an obstacle in the path of the moving barrier (particularly when the moving barrier moves to a closed position) through use of light, sound (including ultrasonic sound), radio-frequency, and/or contact sensing mechanisms. Upon sensing an obstacle, the sensor provides a corresponding signal, which signal can be used by the movable barrier operator accordingly to aid in avoiding potentially harmful contact between the movable barrier and the detected obstacle.

Typically, movable barrier operators that are designed for use with a safe-operation sensor will not function without the safe-operation sensor being coupled to the operator. This arrangement is intended to prevent obstacle collisions from occurring should the operator be installed or later operated for whatever reason without the safe-operation sensor being coupled thereto. Such a design, however, limits the range of application for the operator itself. While some jurisdictions require the concurrent use of a safe-operation sensor, other jurisdictions do not. Further, many jurisdictions that require safe-operation sensors do not require such sensors for all potential applications (for example, such sensors may be required in a residential context but not in an industrial context) and/or some users in jurisdictions that do not require such sensors may nevertheless themselves wish to use such safeguards. By designing an operator to specifically require concurrent coupling to a safe-operation sensor, economies of scale are lost because such an operator cannot address some of the above significant market needs.

In likely recognition of these circumstances, there are at least some movable barrier operators that can function with, or without, a safe-operation sensor. As shipped, such operators are typically programmed as non-sensor operators, meaning that the operator may be initially installed and operated without coupling a safe-operation sensor thereto. In the alternative, at the time of installation or at any time thereafter, trained personnel can connect a safe-operation sensor to the operator (typically by connecting appropriate signal-carrying conductors either directly to a motherboard (using, for example, terminal posts provided for this purpose) or by coupling the conductors to an intermediary board (or card) that is inserted into a corresponding socket or base on the motherboard). Once so connected, the installer than usually configures a dual inline package (DIP) switch as provided on the operator to initiate a learning mode and thereby inform the operator of the existence of the safe-operation sensor. The operator will then function thereafter in tandem with the sensor.

Unfortunately, installers often forget or otherwise neglect to initiate or complete the learning step described above. As a result, even though the safe-operation sensor is coupled to the operator (and may even be drawing working current therefrom), the operator in fact is unaware of the sensor and is not paying attention to any obstacles the sensor detects. This improper installation can of course lead to unsafe and even dangerous circumstances. Therefore, such prior art approaches used to address the need for a dual-mode movable barrier operator can in fact raise additional problems and concerns.

BRIEF DESCRIPTION OF THE DRAWINGS

The above needs are at least partially met through provision of the automatic sensing of safe-operation sensor apparatus and method described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

Generally speaking, pursuant to these various embodiments, during at least one normal operating mode of a movable barrier operator, the operator will detect the presence of at least one safe-operation sensor (automatically and without user initiation) and, upon detecting the presence of such a sensor, will thereafter alter at least one normal operating mode of the movable barrier operator whenever the safe-operation sensor is thereafter not detectable. So configured, the operator can serve both with and without a safe-operation sensor without requiring a specific user-initiated learning mode. Furthermore, once the operator has been used with a safe-operation sensor, the operator will thereafter alter its normal operation should the sensor become available for whatever reason (such as by removal of the sensor, damage to the sensor, and/or mis-calibration and/or misalignment of the sensor for whatever reason).

In one embodiment, a user-initiated learning mode can be used to reconfigure the operator to work in an ordinary fashion without the sensor once the operator has automatically detected the sensor as described above. So configured, the operator can later be successfully used without a sensor should such an operating mode be explicitly desired by a user.

In another embodiment, multiple sensors can be used by the operator, and the reaction of the operator to the absence of one or more of these sensors can be predetermined as appropriate to the given application.

In the specific embodiments presented below, the movable barrier comprises a garage door and the safe-operation sensor(s) comprises an infrared light-based obstacle sensor, both as well understood in the art. These specific embodiments serve an illustrative purpose only as the inventive concepts are readily applicable to other kinds of movable barriers and/or safe-operation sensors.

Figure 1:
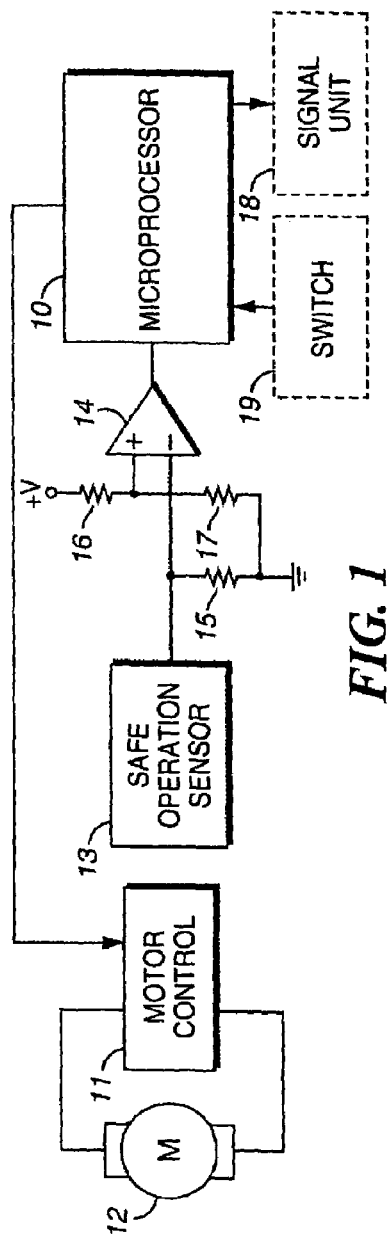
FIG. 1 comprises a block diagram schematic as configured in accordance with an embodiment of the invention.

Referring now to FIG. 1, a typical movable barrier operator will have a microprocessor 10 (or microcontroller or other programmable platform or, in some instances, a hard-wired logic platform) that couples through a motor control 11 interface to a motor 12 that is used to effect powered movement of a movable barrier (typically between closed and opened positions and vice versa). In this embodiment, the microprocessor 10 also couples to a safe operation sensor 13 (again comprising, in this embodiment, an infrared light-based obstacle sensor as well understood in the art) through a circuit comprising, in a preferred embodiment, an operational amplifier 14 (such as, for example, an LM324) having its positive input coupled to a voltage divider that includes two resistors 16 and 17 and having its negative input coupled to a grounded resistor 15 that itself couples to the sensor 13. In a preferred embodiment, the output of the operational amplifier 14 couples to an appropriate interrupt pin of the microprocessor 10 such that intermittent pulses as output by the sensor are readily detectable by the microprocessor 10.

So configured, coupling of the safe-operation sensor 13 to the microprocessor 10 can be readily detected in support of the functionality described further below. In addition, if desired, a signal unit 18 can be provided to source a user-discernable signal to indicate either that the safe operation sensor 13 has been coupled, is coupled, and/or is no longer coupled as desired (such a signal can be any manner of audible, visual, or other user discernable indicia as may be appropriate in a given application, or any combination thereof). Also, again if desired, a switch 19 (such as a DIP switch as well known in the art) can optionally be provided for purposes that are described below in more detail.

Pursuant to these embodiments, the microprocessor 10 (or other programmable platform as is otherwise provided) can be programmed or designed to operate in an initial first mode of operation, which first mode of operation includes detecting connection of the safe-operation sensor 13. In response to detecting such connection, the microprocessor 10 thereafter operates in a subsequent second mode of operation regardless of whether the safe-operation sensor 13 remains connected to the microprocessor 10. For example, in the first mode of operation, the movable barrier can be moved from an opened to a closed position even when a safe-operation sensor is not attached. In the second mode of operation, however, when the safe-operation sensor is not attached and working properly, the movable barrier might not be readily movable from the open position to the closed position.

Figure 2:
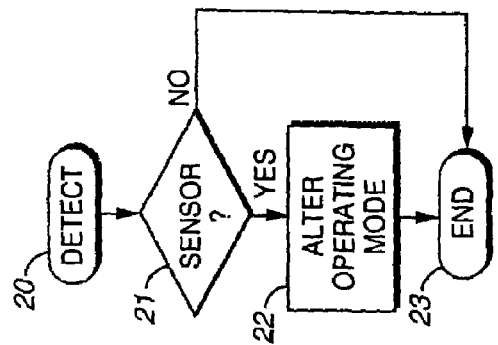
FIG. 2 comprises a generalized flow diagram as configured in accordance with an embodiment of the invention.

Referring now to FIG. 2, and considering such detection functionality 20 from an overall viewpoint, the movable barrier operator detects 21 whether a safe-operation sensor has been attached thereto. If not, the detection functionality concludes 23 and the operator continues in an ordinary fashion (such detection can occur as frequently or infrequently as is appropriate or desired in a given set of operating conditions). When a sensor is detected 21, however, the operating mode of the operator is altered 22. In particular, the operating mode is altered such that the operator will now require the presence of the safe-operation sensor. This functionality occurs automatically and without specific user initiated actions. The operator becomes a sensor-equipped operator simply by attaching the sensor to the operator and operating the operator in an ordinary and regular fashion. The user need not specifically initiate or enable a learning mode as is typically required in the prior art.

Figure 3:
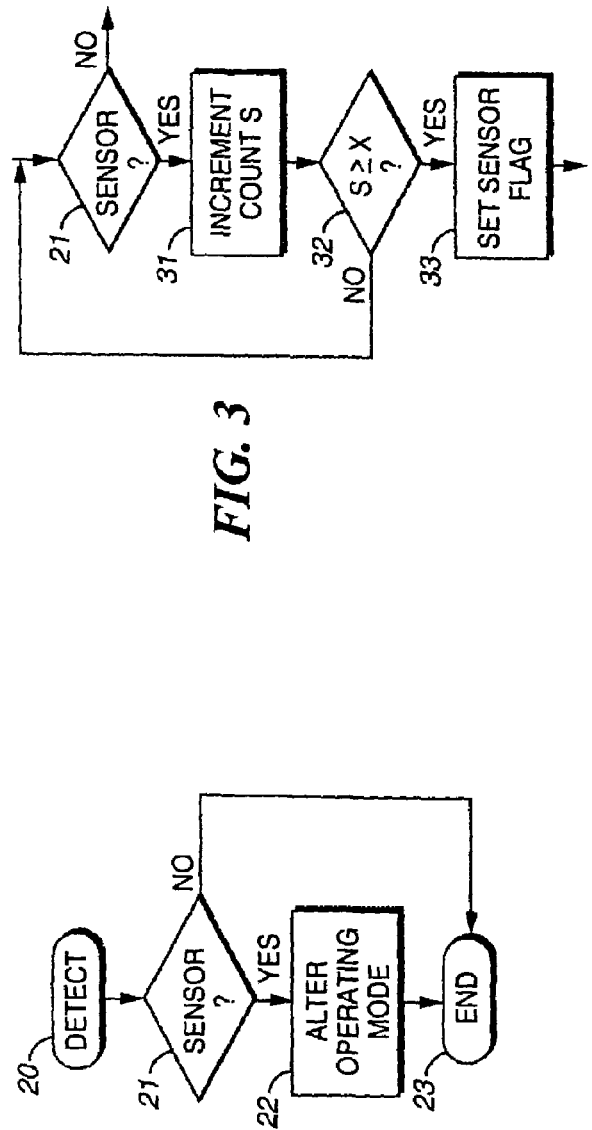
FIG. 3 comprises a more detailed flow diagram as configured in accordance with an embodiment of the invention.

Pursuant to one embodiment, and referring now to FIG. 3, when the sensor detection 21 described above detects the presence of a sensor, a count S can be incremented 31. This count S is then compared 32 against a threshold value X (such as, for example, 5). The process can then continue to monitor for subsequent indicia of the presence of the sensor. Through such a process, false positives that inaccurately indicate the presence of a sensor can be largely prevented from triggering the new behavior of the operator. Once enough confirming events have occurred (for example, when the threshold is set to "5" and 5 positive detections of the sensor occur) a sensor flag can be set 33 (for example, by writing to a corresponding field in an EEPROM memory that is internal to or otherwise operably coupled to the microprocessor) and the process then continues as described earlier.

If desired, a time window can be built into this process such that a sufficient number of such confirming detections must occur within a specific predetermined period of time. Otherwise, the count S can be reset to zero.

Figure 4:
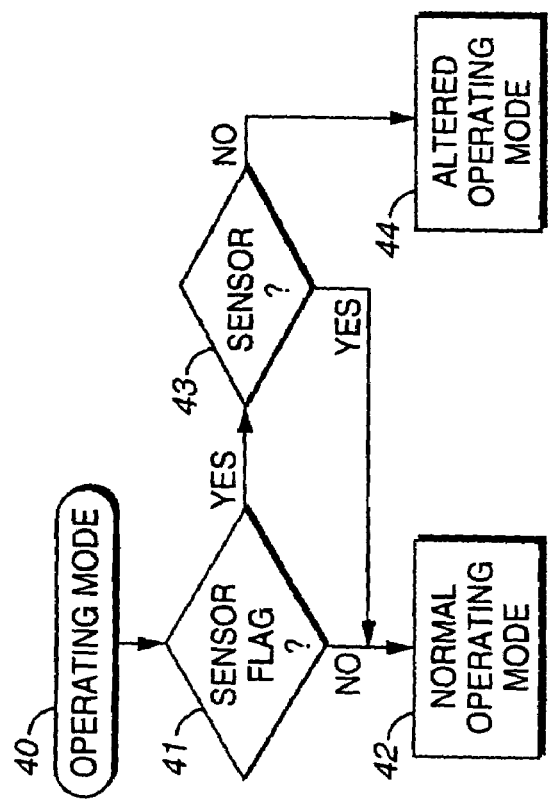
FIG. 4 comprises a detailed flow diagram as configured in accordance with an embodiment of the invention.

Such an approach allows for operation as set forth in FIG. 4. During operation 40, the microprocessor determines 41 whether the sensor flag described above has been set. If not, no safe-operation sensor has been previously detected and the operator engages in its normal operating mode 42. When, however, the sensor flag has been previously set, the operator then determines 43 whether the safe-operation sensor remains so connected. When true, normal operation again prevails 42. When the sensor is not, however, still attached (and operating in a proper manner), the operator alters 44 its operating mode.

The precise nature of the alteration can vary with the specific application. For example, the closing mode can be altered, the opening mode, a stopped-waiting-for-action-to-be-initiated mode of operation, or all of these (altering both the opening and closing process is particularly appropriate when using these concepts with a sliding gate style of movable barrier operator). The alteration itself can include preventing full or partial closing or opening of the movable barrier and/or movement of the movable barrier in a direction opposite that which has been instructed by a user.

Figure 5:
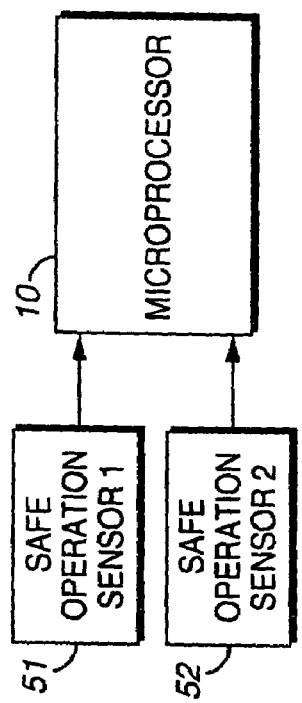
FIG. 5 comprises a block diagram as configured in accordance with yet another embodiment of the invention.

In the embodiments described, a single safe-operation sensor has been attached to the operator. These concepts are readily extendable to use with multiple sensors, however. For example, as shown in FIG. 5, two safe-operation sensors 51 and 52 can be coupled to a single operator microprocessor 10 as is already understood in the art (for example, two infrared light sensors may be used with a single operator to monitor two different areas of the opening for potential obstacles).

Figure 6:
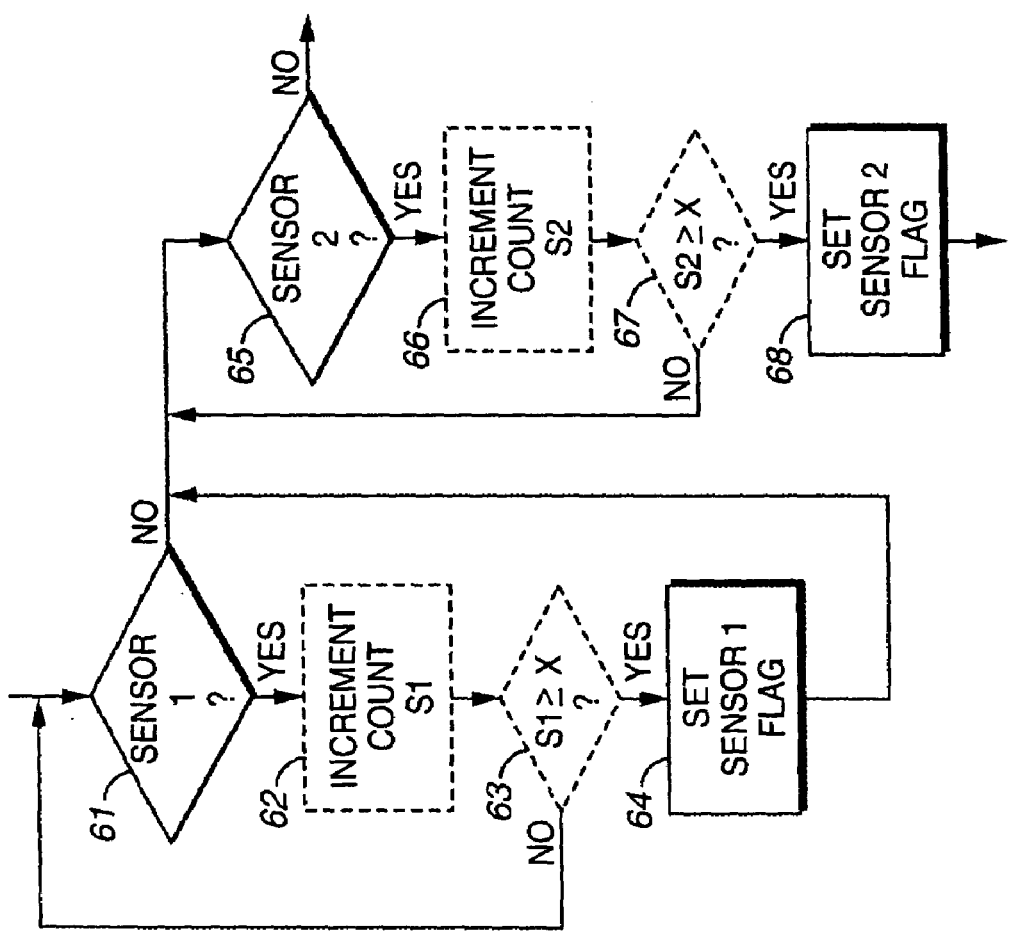
FIG. 6 comprises a detailed flow diagram as configured in accordance with yet another embodiment of the invention.

When using multiple sensors the above-described embodiments are readily modifiable to accommodate such a configuration. For example, with reference to FIG. 6, during ordinary initial operation, the operator can first detect 61 for presence of a first sensor and then detect 65 for presence of a second sensor. When the first sensor is detected 61, a count S1 as corresponds to the first sensor can be incremented 62 and compared 63 against a threshold value to allow eventual setting 64 of a flag for the first sensor (much as described above). Similarly, when the second sensor is detected 65, a count S2 as corresponds to the second sensor can be incremented 66 and compared 67 against a threshold value to allow eventual setting 68 of a flag for the second sensor. (The threshold used to test for a likely assured presence of the first and second sensor can be the same for both sensors or different as appropriate to the given situation.) So configured, the operator can detect the presence of either or both sensors (it should be well understood that yet additional sensors could be similarly accommodated if desired).

Detection of multiple sensors can be used in various ways as desired. For example:

(1) Once a given sensor has been connected, the operator can require continued presence of that particular sensor (or at least the coupling of a sensor to that particular sensor interface and input);

(2) Once any sensor has been connected, the operator can require continued presence of at least one sensor (for example, if a first sensor is coupled, and then a second sensor, and then the first sensor is uncoupled, the operator could continue to operate in an ordinary fashion because the second sensor is still connected); or (3) Once a first sensor has been connected, the operator can require the presence of multiple sensors even though additional sensors have not yet been connected.

Other permutations and combinations are of course possible.

Figure 7:
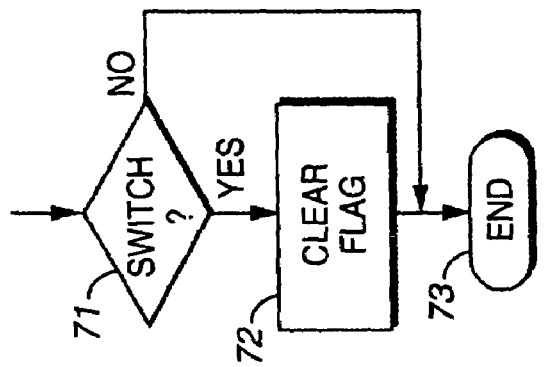
FIG. 7 comprises a detailed flow diagram as configured in accordance with yet another embodiment of the invention.

Pursuant to the above embodiments, a movable barrier operator can successfully function as a non-sensor-based operator provided no sensors are coupled to the operator. Once a sensor is coupled and used, however, the operator becomes a sensor-based operator and will require continued presence of a properly functioning sensor to ensure ordinary operation. This result occurs automatically and without the need for any specific user-initiated learning mode. It is possible, however, that a user may wish to disconnect a sensor from an operator and have the operator again function as a non-sensor-based operator. To accommodate such needs, if desired, a switch (such as switch 19 as described in FIG. 1) or other appropriate user interface can be provided to initiate what effectively amounts to an unlearn mode of operation. For example, with reference to FIG. 7, upon detecting 71 the appropriate setting of such a switch, the operator can clear 72 the sensor flag indicia (or flags where multiple sensors are monitored) and conclude 73, thereby effectively returning the operator to its pre-sensor state of functionality. So configured, the operator will now function in an initialized state and will not require the presence of a sensor to effect ordinary operation.

Pursuant to these various embodiments, a single movable barrier operator can be used in a variety of user settings without need for special user training and/or actions. Instead, the operator will automatically serve both with and without safe-operation sensors in a safe and appropriate manner.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

What is claimed is:

1. A movable barrier operator comprising:
   a movable barrier interface for implementing movement of a barrier;
   a controller having an obstacle detection input and being operatively coupled to the movable barrier interface for controlling movement of the barrier via the barrier movement interface and having at least a first and a second automatic mode of barrier movement, wherein:
      when the obstacle detection input is not operably coupled to at least one obstacle detector, the controller controls the movable barrier interface in accordance with the first automatic mode of barrier movement; and
      when the obstacle detection input is operably coupled to at least one obstacle detector, the controller controls the movable barrier interface in accordance with a second automatic mode of barrier movement.

2. A movable barrier operator according to claim 1 wherein the first and second operating automatic modes control the closing of the barrier.

3. A movable barrier operator according to claim 2 wherein the first automatic mode of barrier movement implements safer barrier closing in the absence of an operably connected obstacle than does the second automatic mode of barrier movement.

4. A movable barrier operator according to claim 1 wherein the controller detects an operable coupling of an obstacle detector to the obstacle detection input.

5. A movable barrier operator according to claim 4 wherein the controller detects the presence of an obstacle detector connected to the obstacle detector input.

6. A movable barrier operator according to claim 4 wherein the controller detects the operability of an obstacle detector connected to the obstacle detector input.

7. A moveable barrier operator according to claim 4 wherein the obstacle detector is selected from a group comprising a light-based obstacle detector sensor; a sound-based obstacle detection sensor; a radio frequency-based obstacle detection sensor; and a contact-based obstacle detection sensor.

8. A moveable barrier operator according to claim 1 wherein the first automatic mode and the second automatic mode are selected from a group comprising: an opening mode of operation; a closing mode of operation; and a stopped-waiting-for-action-to-be-initiated mode of operation.

* * * * *